United States Patent

[11] 3,548,989

| [72] | Inventor | Robert S. Root |
| --- | --- | --- |
| | | Syracuse, N.Y. |
| [21] | Appl. No. | 759,042 |
| [22] | Filed | Sept. 11, 1968 |
| [45] | Patented | Dec. 22, 1970 |
| [73] | Assignee | Lipe-Rollway Corporation |
| | | Syracuse, N.Y. |
| | | a corporation of New York |

[54] SELF-ADJUSTING CLUTCH MECHANISM
1 Claim, 1 Drawing Fig.

[52] U.S. Cl..................................................... 192/111,
192/91; 60/54.5
[51] Int. Cl....................................................F16d 11/00,
F16d 13/60
[50] Field of Search........................................... 192/111A,
91A

[56] References Cited
UNITED STATES PATENTS
| 2,593,192 | 4/1952 | Rockwell.................... | 192/91AX |
| --- | --- | --- | --- |
| 2,307,667 | 3/1967 | Maurice.................... | 192/91X |
| 2,967,396 | 1/1961 | Staadt......................... | 192/91X |

*Primary Examiner*—Benjamin W. Wyche
*Attorney*—John R. Varney

ABSTRACT: A self adjusting clutch release mechanism comprising three hydraulic cylinders all in fluid communication with each other, one cylinder having a spring biased piston keeping the hydraulic fluid under constant pressure, another cylinder operative to close a fluid port communicating with the aforementioned cylinder, the remaining cylinder having a piston reacting hydraulically by the piston closing the aforementioned port to move a clutch release lever to disengage the clutch, and is biased into contact with the clutch release lever, as the clutch wears the clutch release lever moves further from the hydraulic cylinders allowing the piston that is in contact with the release lever to move lowering the pressure on the hydraulic fluid in back of it and on the return of the cylinder covering the aforementioned port the spring biased piston moves regaining the pressure in the cylinders.

PATENTED DEC 22 1970
3,548,989
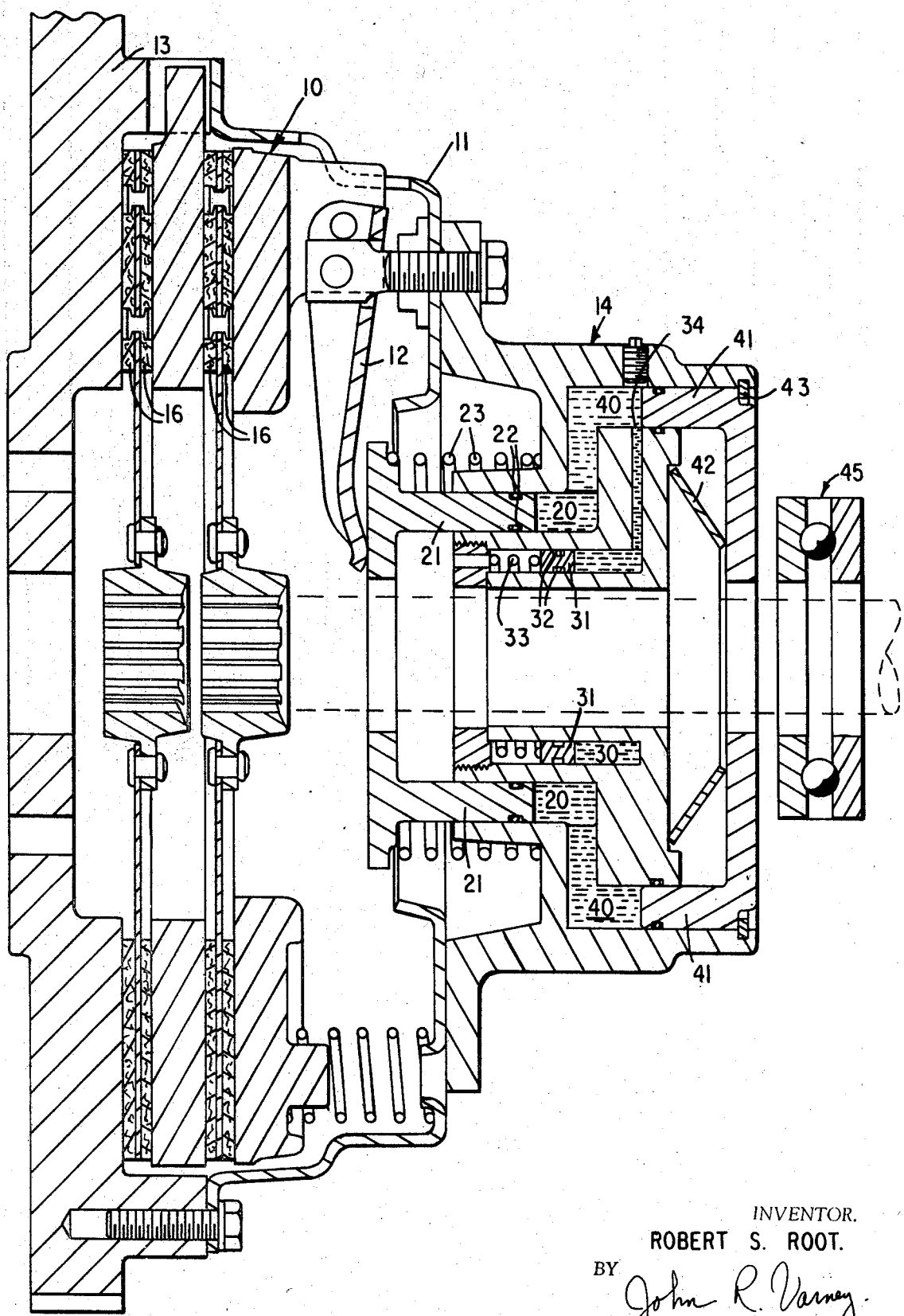
INVENTOR.
ROBERT S. ROOT.
BY John R. Varney.
ATTORNEY.

SELF-ADJUSTING CLUTCH MECHANISM

BACKGROUND OF THE INVENTION

In heavy truck type and construction vehicles driven with internal combustion engines, friction disc clutches are used to connect the engines with the running gears of these vehicles. With heavy use the engine and running gear are connected and disconnected many times for the changing of gears, stopping and starting and operating miscellaneous equipment used therewith. As the clutch is used it wears and the original adjustment is no longer in effect. If allowed to run when badly out of adjustment the clutch will skip and no longer function to connect the engine with the running gears.

To avoid accelerated friction disc facing wear and release bearing wear the clutch release linkage must be readjusted many times to prolong the functional life of the clutch; to compensate for facing wear; and to prevent continuous release bearing operation. With the mechanism disclosed in this invention, clutch and pedal linkage readjustment is never needed for its original position in reference to release bearing and pedal linkage is adjusted automatically each time the clutch is engaged. The maintenance on vehicles using this mechanism is thus drastically reduced.

SUMMARY OF THE INVENTION

In accordance with the preferred embodiment of this invention a hydraulic operated self adjusting mechanism for a friction clutch is provided employing a number of hydraulic cylinders of which one is spring biased to maintain a uniform pressure on the remaining pistons. One piston moves to close off the effect of the spring biased piston and hydraulically move another piston to operate a clutch release lever and disengage the clutch connection therewith. Upon release the spring biased piston is again in fluid communication with the other cylinders and if wear has occurred in the friction disc the fluid pressure will be slightly depleted, the biased piston moves to regain the aforementioned uniform pressure.

An adjusting mechanism in accordance with this invention provides improved efficiency and prolonged clutch life, while at the same time it eliminates the need for periodic readjustment and reduces vehicle down time. Consequently by employing the type of self adjusting clutch mechanism described herein, the friction clutch will be operated at more nearly optimum design adjustment throughout the life of the clutch.

DESCRIPTION OF THE DRAWING

The drawing is a sectional view of a friction disc clutch including the novel self adjusting mechanism of our invention.

DESCRIPTION OF THE PREFERRED EMBODIMENT

As shown in the drawing there is a disc clutch 10 typical of those used with internal combustion engines and enclosed within a cover 11 having a release lever 12 operatively connected therewith. The clutch 10 and the cover 11 are bolted to the flywheel 13 of the internal combustion engine. Bolted to the clutch cover 11 is an annular base 14 having three hydraulic cylinders 20, 30 and 40 formed therein. Cylinder 20 has a piston 21, with sealing O-rings 22, biased by a spring 23 into contact with release lever 12. Spring 23 has strength enough to hold piston 21 against the release lever 12 but will not move it.

Cylinder 30 has a piston 31, with sealing O-rings 32, biased by spring 33 creating a constant pressure in cylinders 20, 30 and 40. Spring 33 has strength enough to move the piston 31 and keep the fluid under a slight pressure but insufficient to move the release lever in conjunction with spring 23. Cylinder 30 is in fluid communication with cylinders 20 and 40 by a port 34.

Cylinder 40 has therein a piston 41 spring biased by a heavy Belleville washer type spring 42. The base member 14 has a stop ring 43 secured to it adjacent cylinder 40, the spring 42 holds piston 41 against the stop ring 43. The port 34 of cylinder 30 is right at the head of the piston 41 and upon movement of throw out bearing 45 into engagement with piston 41, the piston 41 moves forward closing port 34. Further movement of piston acting against the hydraulic fluid moves piston 21 and clutch release lever 12 to effect disengagement of clutch 10. As shown in the drawing pistons 21, 31 and 41 and cylinders 20, 30 and 40 are circular and rotate with the base member 14 around the driven shaft shown in dashed lines.

The throw out bearing 45 has a fixed clearance with piston 41 when in the released position with the clutch engaged. This clearance is held by the base member 14, clutch cover 11, stop ring 43 and piston 41 all being fixed and having no wear.

As wear occurs in the friction discs 16, release lever 12 moves to the right as seen in the drawing. As such wear takes place the lever 12 doesn't return to its original position and piston 21 under the influence of spring 23 moves further out to maintain engagement with the rear of piston 21 thus decreasing the pressure on the hydraulic fluid in the cylinders. As the throw out bearing 45 moves away from piston 41 port 34 is uncovered. Spring 33 in trying to keep a constant pressure on the hydraulic fluid forces piston 31 to the right and the hydraulic fluid thru port 34 until pressure is again equalized in cylinder chambers 30 and 40.

It will be easily understood that as any wear occurs on the disc 16 it is automatically adjusted and the clearance between the throw out bearing 45 and the piston remain fixed.

While a preferred embodiment of the invention has been described and illustrated, it should be understood that the invention is not limited thereto but may be otherwise embodied within the scope of the following claims.

I claim:

1. A clutch release mechanism self adjusting to compensate for wear, the combination of a friction type disc clutch, a cover enclosing the clutch, a clutch release lever operatively secured to said clutch cover for engaging and disengaging said clutch and biased in the engaged position, a base forming hydraulic cylinders and secured to said clutch cover, a plurality of cylinders in said base, a hydraulic fluid in communication with all of said cylinders, a first piston operative in a first cylinder biased into contact with said release lever, a second piston operative in a second cylinder biased against said hydraulic fluid maintaining a constant pressure in said cylinders, a stop member secured in said base in alignment with a third cylinder, a third piston operative in said third cylinder biased against said stop member, a fluid port communicating said second cylinder with the first and third cylinder and said port closable by said third piston.